Aug. 7, 1962 P. S. JORGENSEN 3,047,962
ACCELERATION COMPENSATED PENDULUM
Filed May 28, 1959
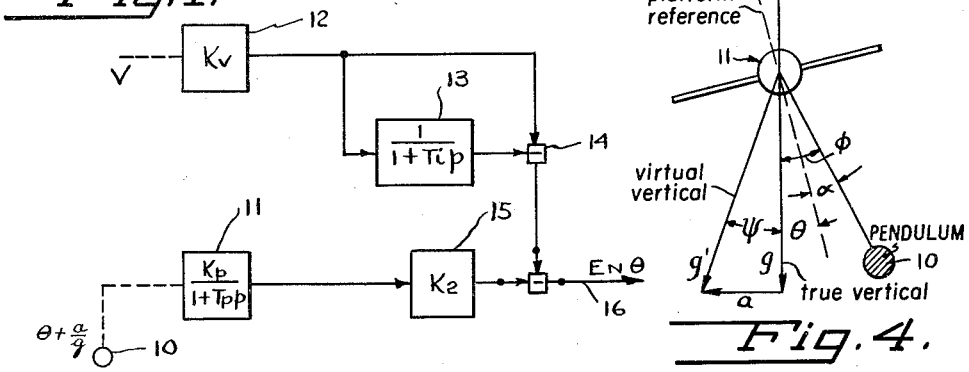
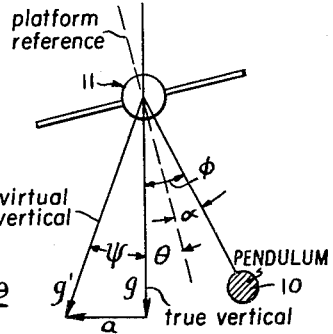
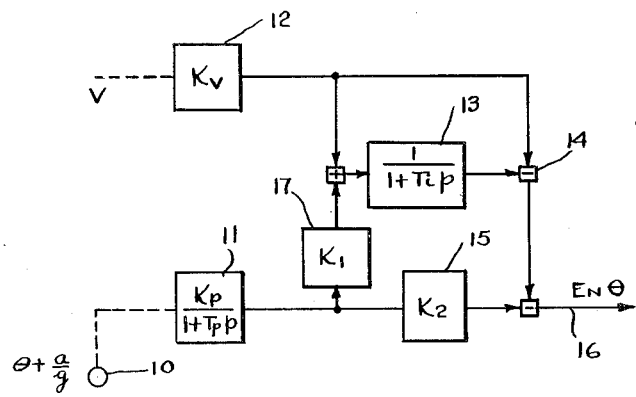
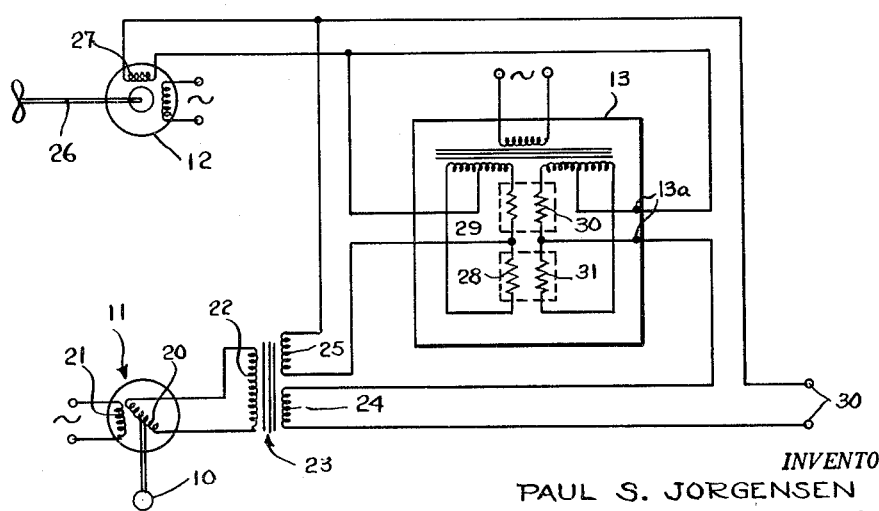
INVENTOR.
PAUL S. JORGENSEN
BY
Raymond A. Paquin
ATTORNEY.

United States Patent Office 3,047,962
Patented Aug. 7, 1962

3,047,962
ACCELERATION COMPENSATED PENDULUM
Paul S. Jorgensen, Westbury, N.Y., assignor to American Bosch Arma Corporation, a corporation of New York
Filed May 28, 1959, Ser. No. 816,624
5 Claims. (Cl. 33—215)

The present invention relates to pendulums and has particular reference to means for compensating a damped pendulum indication against error producing accelerations.

It is well known that a pendulum is sensitive to accelerations of its support and these accelerations will result in errors in the vertical indication unless compensated for in some manner.

The present invention is a simple and novel method for performing this compensation from a measure of velocity along the sensitive axis of the pendulum. The velocity signal is transmitted through a time delay unit and the difference between the instantaneous velocity signal and the time delayed signal is subtracted from the pendulum output, which is properly scaled, to accomplish the elimination of the acceleration produced error to obtain a signal indicative of the true vertical.

If the time constant of the delay unit matches the time constant of the pendulum, the error producing effect will be eliminated as described without additional circuitry.

However, in general the time constant of the delay unit is not the same as the time constant of the pendulum. The elimination of the eror producing effect can be accomplished by this method by combining a portion of the pendulum output with the velocity signal at the input to the time delay unit.

For a more complete understanding of this invention, reference may be made to the accompanying diagrams in which, FIG. 1 is a schematic block diagram of the basic compensation unit;

FIG. 2 is a schematic block diagram of a modification of FIG. 1;

FIG. 3 is a particular embodiment of the circuit shown in FIG. 2; and

FIG. 4 is an explanatory diagram for interpreting the displacement of the pendulum.

With reference now to FIG. 1, a viscously damped pendulum 10 is attached to the movable member of a transducer 11 (the case of which is attached to a support or platform) by which an electrical signal dependent upon the displacement of the pendulum is produced. The relationship between the output of the transducer 11 and the tilt of the platform from the true vertical may not be familiar and for ease of understanding the invention that relationship will be derived here.

FIGURE 4 shows the angles involved in the derivation wherein $\theta$ is the angle of tilt between the true vertical and the normal to the platform.
$\phi$ is the angle of tilt between the true vertical and the pendulum.
$\alpha$ is the angle between the pendulum and the platform normal and is the angle measured by the pendulum pickoff, $=\phi-\theta$.
$\psi$ is the apparent shift of the vertical due to an acceleration reaction force "$a$" from the true vertical "$g$" to a virtual vertical "$g'$."

Now consider the forces acting on the pendulum. The gravity and acceleration force is $g' \sin(\psi+\phi)$ and the viscous damping force is $$C\left(\frac{d\phi}{dt}-\frac{d\theta}{dt}\right)$$

where C is the viscous drag coefficient. The damping of the pendulum is high, many times critical damping so that the angular acceleration term in the equation of motion can be safely ignored. Thus, with negligible error, the sum of these forces is equal to zero so that $$g' \sin(\psi+\phi) + C\left(\frac{d\phi}{dt}-\frac{d\theta}{dt}\right) = 0 \qquad (a)$$

Assuming that for the small angles involved the following identities hold true $$g' = g$$
$$\sin(\psi+\phi) = \psi+\phi$$
$$\tan \psi = \psi = \frac{a}{g}$$

Equation $a$ becomes $$g\left(\frac{a}{g}+\phi\right) + C\left(\frac{d\phi}{dt}-\frac{d\theta}{dt}\right) = 0 \qquad (b)$$

letting $$T_p = \frac{c}{g}$$

and substituting $(\alpha+\theta)$ for $\phi$ and $$\frac{d\alpha}{dt} \text{ for } \left(\frac{d\phi}{dt}-\frac{d\theta}{dt}\right)$$

Equation $b$, can be rewritten as $$\frac{a}{g}+\alpha+\theta+T_p\frac{d\alpha}{dt}=0 \qquad (c)$$

solving for $\alpha$ and using the differential operator notation where $$\frac{d}{dt}=p$$

$$\alpha=-\frac{1}{T_p P+1}\left(\frac{a}{g}+\theta\right) \qquad (d)$$

Since the output of the transducer 11 is proportional to the angle $\alpha$, the signal from the transducer 11 can be represented by:

$$E_p = \frac{K_p}{1+T_p p}\left(\theta+\frac{a}{g}\right) \qquad (1)$$

where $K_p$ is a constant
$T_p$ is the time constant of the pendulum
$p$ is the differential operator $\frac{d}{dt}$
$\theta$ is the tilt between the true vertical and the normal to the platform supporting the transducer 11
$a$ is the acceleration of the platform
$g$ is the acceleration of gravity An indication of velocity, available from any type of velocity indicator capable of indicating true speed with respect to earth is adapted to adjust a transducer 12 to produce a signal which can be represented by:

$$E_v = K_v V \qquad (2)$$

where $K_v$ is a constant
$V$ is the velocity of the supporting platform

The $K_v V$ signal is applied to the time delay unit 13 which may be of the thermal delay type in which the relation between the output and input may be represented by $$\frac{1}{1+T_{i}p}$$

so that the output of the delay unit 13 is $$\frac{K_v V}{1+T_i p}$$

where $T_i$ is the time constant of the time delay unit 13

$p$ is the differential operator $\frac{d}{dt}$

The output of the time delay unit 13 is subtracted from the output of the transducer 12 to produce a signal $$K_v V - \frac{K_v V}{1+T_{i}p} \quad (4)$$

at the output of the subtraction device 14, which is algebraically reduced to $$\frac{K_v T_i}{1+T_{i}p} pV \text{ or } \frac{K_v T_i}{1+T_{i}p} a$$

since $pV$ represents a differential of velocity $$\frac{dV}{dt}$$

or the acceleration $a$.

The output of the pendulum transducer 11 is transmitted through a scaling device 15 having a transmission factor of $K_2$ and the output of the device 15 is combined with the output of the device 14 to produce a signal E at lead 16, where $$E=\frac{K_p K_2}{1+T_p p}\left(\theta+\frac{a}{g}\right)-\frac{K_v T_i}{1+T_{i}p}a \quad (5)$$

from which:

$$E=\frac{K_p K_2 \theta}{1+T_p p}+\frac{K_p K_2}{g(1+T_p p)}a-\frac{K_v T_i}{1+T_{i}p}a \quad (6)$$

If $T_p = T_i$ then for the "$a$" terms to cancel each other $$\frac{K_p K_2}{g}=K_v T_i = K_v T_p$$

and $$K_2=\frac{K_v T_p g}{K_p} \quad (7)$$

and therefore $$E=\frac{gK_v T_p}{1+T_p p}\theta \quad (6a)$$

Equation 6a is the equation for a viscously damped pendulum in which the output is a function of only the tilt of the platform and the time constant is $T_p$.

In the event that $T_i$ does not equal $T_p$, using the relationship of Equation 7, the last two terms of Equation 6 reduce to $$\frac{gK_v(T_p-T_i)}{(1+T_p p)(1+T_{i}p)}a \quad (8)$$

It will be seen that if a portion $K_1$ of the pendulum output of transducer 11 as selected in scaling device 17 is also transmitted through the time delay unit 13 as shown in the FIG. 2, a signal proportional to $$\frac{K_1 K_p}{(1+T_p p)(1+T_{i}p)}\left(\theta+\frac{a}{g}\right)$$

is obtained which, when combined subtractively in Equation 6 with Equation 7 results in $$E=\left[\left(\frac{gK_v T_p}{1+T_p p}\right)-\left(\frac{K_1 K_p}{(1+T_p p)(1+T_{i}p)}\right)\right]\theta$$
$$+\left[\frac{gK_v(T_p-T_i)-K_1 K_p}{(1+T_p p)(1+T_{i}p)}\right]\frac{a}{g} \quad (9)$$

If $K_1$ is selected so that $$gK_v(T_p-T_i)=K_1 K_p$$

then $$K_1=\frac{gK_v}{K_p}(T_p-T_i) \quad (10)$$

and the acceleration term in Equation 9 is zero so that $$E=\left[\frac{gK_v T_p}{(1+T_p p)}-\frac{gK_v(T_p-T_i)}{(1+T_p p)(1+T_{i}p)}\right]\theta \quad (11)$$

from which $$E=\frac{gK_v T_i}{(1+T_{i}p)}\theta \quad (12)$$

and it will be seen that the signal E is the output of a viscously damped pendulum of time constant $T_i$, which is affected only by the tilt of the platform supporting the pendulum.

With reference now to FIG. 3 there is shown a possible preferred embodiment of the circuit shown in FIG. 2. Here, a pendulum 10 is attached to the rotor coil 20 of an electromechanical rotary pickoff device 11, the primary winding 21 of which is energized by an alternating voltage. The output of the coil 20 is adapted to energize the primary winding 22 of the transformer 23. The transmission ratio between the primary winding 22 and secondary winding 24 is equal to $K_2$ as defined by Equation 7, and the transmission ratio between primary winding 22 and secondary winding 25 is equal to $K_1$ as defined by Equation 10.

The transducer 12 may be an electromechanical generator in which the shaft 26 is driven by a pitometer log in the case of naval craft, for example, to produce in the output winding 27 a signal proportional to $K_v V$. The time delay unit 13 is preferably of the thermal type described in U.S. Patent 2,700,829 in which the thermal state of a pair of heating resistors 28, 29 is unbalanced by an input signal comprised of the sum of the outputs from generator winding 27 and the secondary winding 25. The output signal representing the resistive unbalance of a pair of thermally sensitive resistors 30, 31 is equal to the input signal in amplitude but is delayed in time where the time delay is dependent on the physical constants and construction of the unit 13 and may be varied over a wide range by proper selection of parameters.

The output of time delay device 13 at terminals 13a is connected in series with the generator winding 27 and transformer winding 24 so as to produce the output signal E at terminals 30 defined by Equation 9. It will be recognized that the circuit of FIG. 3 is merely schematic and additional components such as amplifiers, phase shifters, isolation devices and so on might be necessary for proper operation.

It will be evident that although many changes may be made in the implementation of the invention, this basis of the invention lies in the use of a value proportional to present velocity and a value of velocity delayed in time with respect to the present to provide an acceleration correction by combination of these values with a properly scaled pendulum output. The scaling depends upon the time constant of the delay device as well as the acceleration of gravity.

I claim:

1. In a device of the character described, a viscously damped pendulum mounted on a vehicle, pickoff means actuated by said pendulum and having an output, means for determining the velocity of said vehicle and producing a signal proportional thereto, signal delay means having an input and an output, said pickoff means output and said velocity signal being connected to said input, means combining said signal delay means output and said velocity signal.

2. In a device of the character described, a viscously damped pendulum mounted on a vehicle, pickoff means actuated by said pendulum and having an output, means for determining the velocity of said vehicle and producing a signal proportional thereto, signal delay means having an input and an output, first means for modifying the output of said pickoff means, said input being energized jointly by the velocity signal and the modified pickoff means output, second means for modifying the pendulum output, and means for combining the signals from said second modifying means and said delay means and the velocity signal.

3. In a device of the character described, a viscously damped pendulum mounted on a vehicle, pickoff means actuated by said pendulum and having an output, means for determining the velocity of said vehicle and producing a signal proportional thereto, thermal signal delay means having an input and an output, said pickoff means output and said velocity signal being connected to said input, means for combining said signal delay means output and said velocity signal.

4. In a device of the character described, a viscously damped pendulum mounted on a vehicle, pickoff means actuated by said pendulum and having an output, means for determining the velocity of said vehicle and producing a signal proportional thereto, thermal signal delay means having an input and an output, first means for modifying the output of said pendulum, said input being energized jointly by the velocity signal and the modified pickoff means output, second means for modifying the pendulum output, and means for combining the signals from said second modifying means and said delay means and the velocity signal.

5. In a device of the character described, a viscously damped pendulum mounted on a vehicle, pickoff means actuated by said pendulum and having an output, means for determining the velocity of said vehicle and producing a signal proportional thereto, signal delay means having an input and an output, first means for modifying the output of said pendulum, said input being energized jointly by the velocity signal and the modified pendulum output, second means for modifying the pickoff means output, and means for combining the signals from said second modifying means and said delay means and the velocity signal, the transfer function of said second modifying means being proportional to the time constant of said pendulum and the transfer function of said first modifying means being proportional to the difference between the time constants of said pendulum and said delay means.

References Cited in the file of this patent

UNITED STATES PATENTS

| | | |
|---|---|---|
| 2,659,985 | Cloud | Nov. 24, 1953 |
| 2,700,829 | Statsinger | Feb. 1, 1955 |
| 2,947,480 | Hirsch | Aug. 2, 1960 |